June 28, 1960 R. B. SOLDINI 2,942,731
MACHINE FOR SALVAGING WASTE CONCRETE MATERIAL
Filed Aug. 9, 1957 2 Sheets-Sheet 2
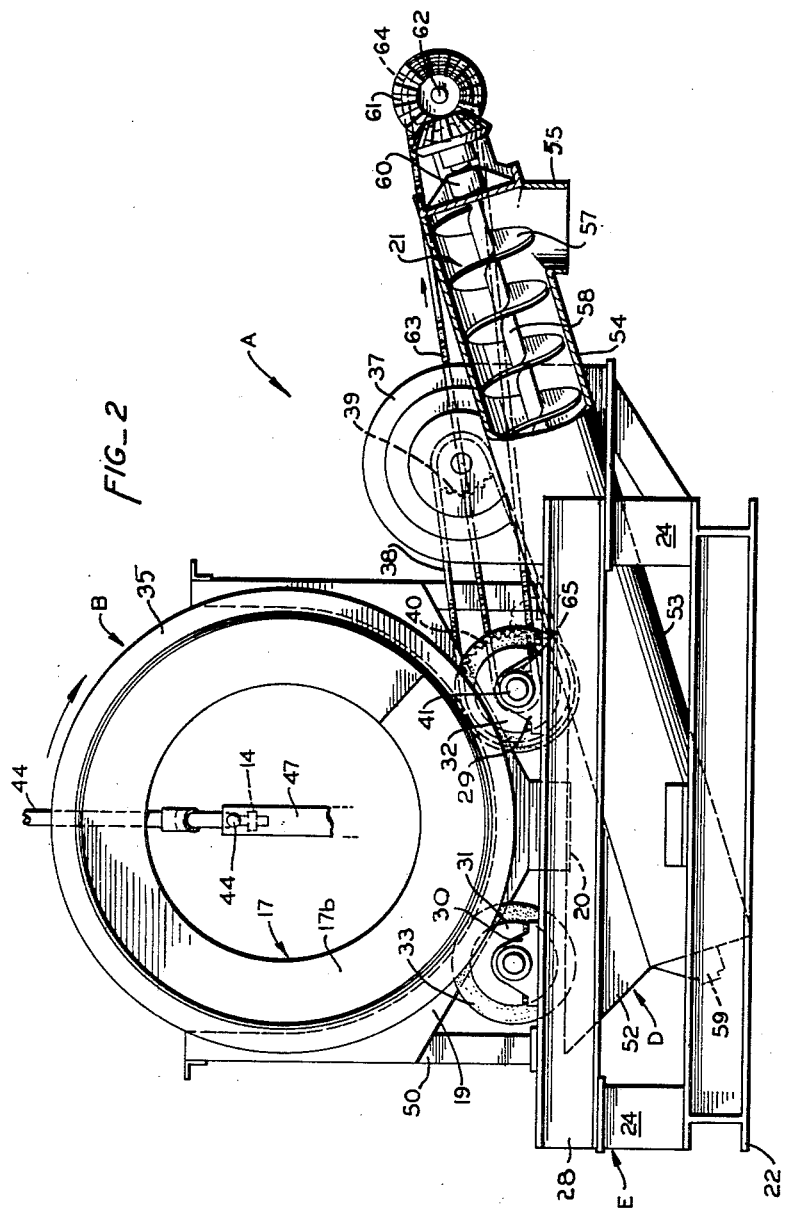
INVENTOR.
ROBERT B. SOLDINI
BY
Hansen and Fane
ATTORNEYS

United States Patent Office 2,942,731
Patented June 28, 1960

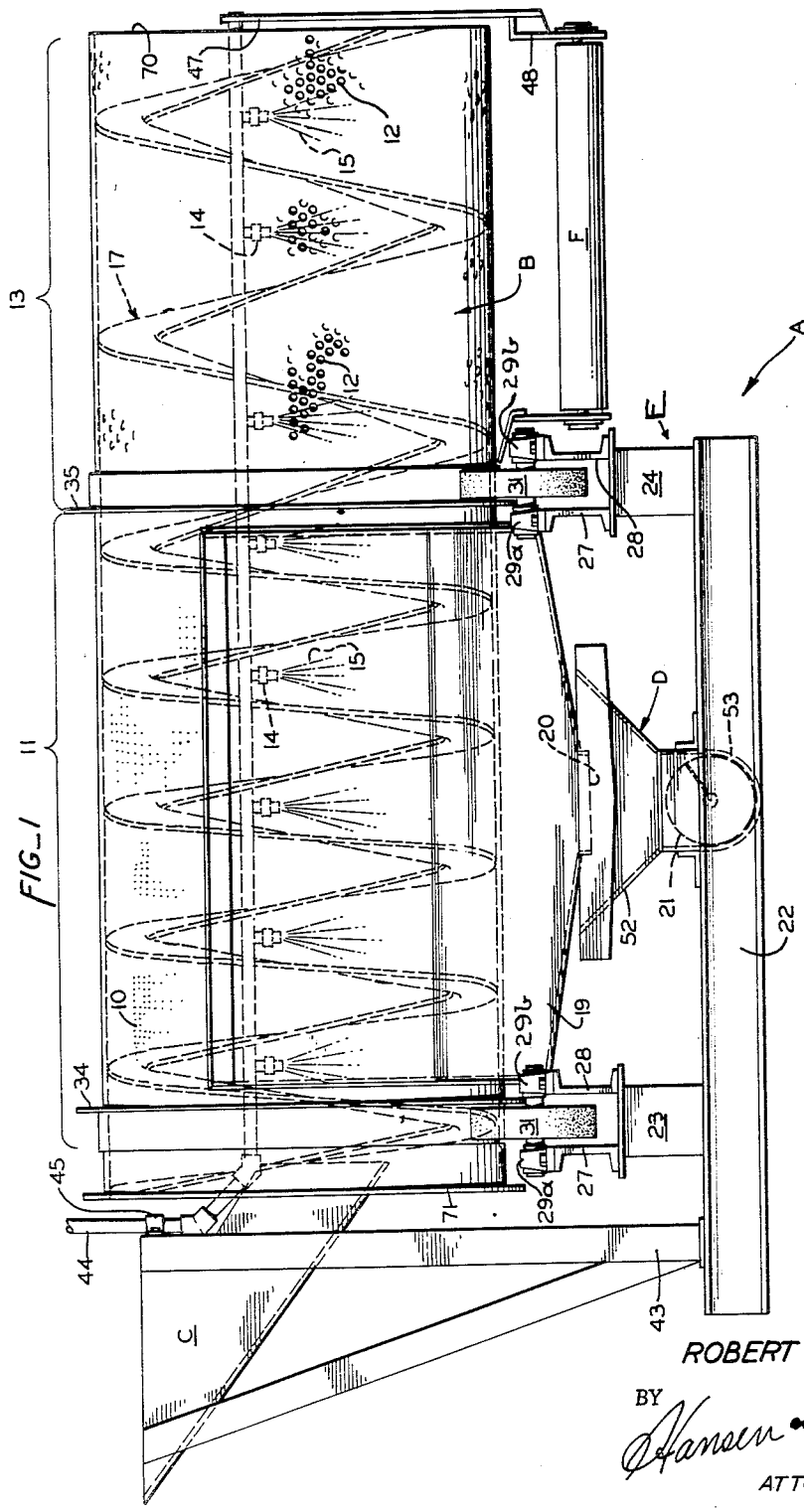

2,942,731
MACHINE FOR SALVAGING WASTE CONCRETE MATERIAL

Robert B. Soldini, 13 Corte Dorado, Millbrae, Calif.

Filed Aug. 9, 1957, Ser. No. 677,283

1 Claim. (Cl. 209—293)

The present invention relates to a waste concrete salvaging mechanism, and pertains more particularly to a mechanism wherein the various components of waste concrete material are separated from each other and all of the solid components except the cement are salvaged for re-use.

Every working day throughout the United States hundreds and perhaps thousands of tons of concrete are wasted. This is due to the fact that concrete must be used within a reasonably short time after it is mixed or it becomes unsuitable for use. It frequently happens that a concrete mixing truck is unable to dispose of its entire load before returning to the plant, and to the further fact that concrete mixers on large jobs are frequently charged with a batch of concrete which cannot be fully used within the time in which the concrete remains suitable for use. Such excess concrete must be disposed of before is hardens into a rock-like mass.

A common method of disposing of this waste concrete is to flush it out of the machines with water, and to dump it at some point in the yard or adjacent territory, usually into a pit, where the excess water will either run off or soak into the ground. Here the waste concrete hardens, but due to the large amount of water used in flushing it out it does not attain the hardness of normal concrete, but rather a hardness approximating that of hardened clay or of shale. This hardened waste material can be broken up by suitable breaking mechanisms, and it is common practice to break this material up and to use it as fill material where possible. In any event it is waste material, and represents a substantial loss of value in the aggregate and sand embodied therein.

The present invention contemplates the recovery of the sand and gravel from waste concrete material.

A further object is to process waste concrete material before it has hardened so as to wash the sand and aggregate of such material clean of cement, and to segregate the various components of the waste material from each other.

A further object of the invention is to provide an improved and simplified waste concrete salvaging mechanism.

These and other objects and advantages of the invention will be apparent from the following description and the accompanying drawings, consisting of two sheets, wherein Fig. 1 is a side elevational view of one embodiment of the invention, portions thereof being broken away.

Fig. 2 is an end elevational view of the mechanism shown in Fig. 1.

Briefly, the form of the invention shown in Figs. 1 and 2 comprises a waste concrete salvaging machine A having a rotary screen cylinder B with small perforations 10 throughout an initial portion 11 of its axial length, and larger perforations 12 throughout a secondary portion 13 thereof.

Spray heads 14 are mounted to discharge water sprays 15 onto waste concrete material (not shown) introduced into the cylinder B through a feed chute C. A helical feed screw 17 is secured within the cylinder B and agitates and advances the waste concrete material along the cylinder as the latter rotates.

The sand and cement are washed and screened from the waste concrete material in the initial cylinder portion 11, while the helical screw 17 agitates the material and advances it axially along the cylinder toward the right as illustrated in Fig. 1, where the aggregate is separated by screening into desired sizes. The sand, cement and water passing through the smaller holes 10 in the initial cylinder portion 11 fall onto an apron 19 and thence flow downwardly through an opening 20 into a sump D. Here the sand settles out and is removed by a sand elevating screw 21, while the excess water, with the cement entrained therein, over-flows and is flushed to a suitable disposal area.

Referring to the drawings in detail, a supporting frame E is of suitable structural material, and includes a base portion 22, a pair of support standards 23 and 24 on each side thereof, and two pairs of channel steel members 27 and 28 mounted one on each pair of support standards in relatively outwardly facing pairs (Fig. 1).

Two pairs of bearings 29 and 30 are mounted in axially aligned pairs 29a and 29b (Fig. 1) on each pair of channel members 27 and 28.

A pair of cylinder support rollers 31 and 32 are journaled in the bearings 29 and 30, and these rollers preferably are faced with suitable long-wearing material such as nylon or neoprene 33 which will not easily be abraded by the sand and other gritty material with which they come in contact.

The rollers 31 and 32 ride on two annular tracks 34 and 35 encircling the screen cylinder B, each of the tracks preferably rolled up from a piece of angle steel in a well known manner. At least one of these rollers, such as the roller 32 (Fig. 2), is driven by suitable drive means such as a conventional, reduction geared electric motor 37 through a silent chain 38 passing around gears 39 and 40 mounted one on the motor 37 and the other on a driven shaft 41.

The cylinder B is of suitable metal such as steel sheet or plate of a type commonly used in rotary sand and gravel screens. The small holes 10 in the initial or left-hand cylinder portion 11 (Fig. 1) preferably are of approximately ¼″ diameter, so as to permit free passage therethrough of the sand and cement components only of the concrete waste material which is to be processed therein. The larger perforations 12 in the secondary cylinder portion 13 preferably are of approximately ¾″ diameter so as to permit passage therethrough of the larger size gravel in the concrete material being processed.

The helical flight 17, which may be of steel plate, is fixedly mounted within the cylinder B to rotate therewith. The portion of the feed helix 17 within the initial cylinder portion 11 preferably has a shorter pitch than that in the secondary cylinder portion 13, so that the progress of the material through the initial portion of the cylinder will be slower than it will through the secondary cylinder portion 13.

The feed chute C is mounted on suitable supports 43 secured to the base 22, and is inclined at an angle sufficient to cause waste concrete material dumped therein to gravitate therethrough. The chute C projects into the open end of the cylinder B a sufficient distance to insure discharge of the concrete waste material into the cylinder without spillage.

A water pipe 44, connected to a supply of water under suitable pressure, not shown, is supported at one end of the cylinder B on a bracket 45 mounted on the feed chute C, and at the other end on a bracket 47 supported on a frame member 48. The spray heads 14 are mounted at suitable intervals along the water pipe 44 to provide a strong flushing and washing action on the waste concrete material progressing axially along the rotating cylinder B under the action of the feed screw 17.

The apron 19 is of suitable sheet or plate metal, and is supported on legs 50 secured to the horizontal frame members 27 and 28. The apron 19 is formed and arranged to drain toward the central opening 20 therein, so that the water-entrained sand and cement passing through the smaller holes 10 in the initial cylinder portion 11 are flushed downwardly into the sump D.

The sump D is constructed with a larger upper portion 52 and a smaller, inclined lower portion 53. The lower sump portion 53 is open on its upper side and is of inclined cylindrical sectional form to provide an inclined housing for the sand elevating screw 21. An upper screw housing extension 54 is completely cylindrical and forms a co-axial extension of the lower sump portion 53.

A discharge spout 55 is provided in the upper end of the screw housing extension 54 for the discharge of sand carried upwardly through the housing by the sand elevating screw 21 rotating coaxially therein. The sand elevating screw 21 has a helical flight 57 secured about an axial shaft 58. The lower end of the shaft 58 is journaled in a bearing 59 mounted co-axially in the lower end of the lower sump portion 53, while the upper end of this shaft is journaled in a second bearing 60 mounted axially of the upper end of the housing extension 54.

The screw 21 is driven by bevel gears 61 (Fig. 2) from a shaft 62, which in turn is driven by a silent chain 63 passing around gears 64 and 65 provided on the shafts 62 and 41, respectively.

A gravel conveyor F (Fig. 1) is provided beneath the secondary cylinder portion 13 to receive the intermediate size aggregate which is carried beyond the initial cylinder portion 11 and which passes through the holes 12 in this secondary cylinder portion. The conveyor F carries this portion of the aggregate to a desired disposal point such as a usual storage pile (not shown). The larger size aggregate portion which is incapable of passing through the holes 12 in the secondary cylinder portion 13 is discharged by the helical feed screw 17 through the open terminal or righthand end 70 of the cylinder B as shown in Fig. 1, where it may, if desired, be received by another conveyor (not shown) similar to the conveyor F.

The operation of the mechanism shown in Figs. 1 and 2 is as follows:

Before discharging any waste concrete material into the machine, the latter preferably is first placed in operation by starting the motor 37 to cause the cylinder B to rotate in a direction which will advance material in the cylinder B from the feed chute C toward the discharge end 70 of the cylinder. This action also, by means of the various gears and silent chains illustrated in Fig. 2, and described previously herein, turns the sand elevating screw 21 in a direction to elevate sand from the sump D and discharge it through the sand discharge spout 55. The conveyor F also is driven in a desired direction by a conventional drive means, not shown.

A suitable flow of water also is established through the spray heads 14, and this should be of sufficient volume to flush the cement and sand from waste concrete material during its travel through the initial cylinder portion 11, to flush this material downwardly through the apron opening 20, and to flush the cement out with the overflow water from the sump D. Also, in the secondary cylinder portion 13, the water flow from these spray heads should be adequate to insure the washing clean of the aggregate conveyed by the helical flight 17 into and through the secondary cylinder portion 13.

With the mechanism thus operating, waste concrete material (not shown) is discharged into the feed chute C and gravitates therethrough into the lefthand open end 71 of the cylinder B.

The washing action of the water sprays 15 flushes the sand and cement from the aggregate portion of the concrete, and furthermore flushes this sand and cement through the smaller holes 10 in the initial cylinder portion 11, which, with the pitch of the screw flight 17, is long enough to insure that the portion of the concrete material reaching the secondary cylinder portion 13 is washed free of sand and practically free of cement. The remaining aggregate portion of the concrete material being processed passes into the secondary or righthand cylinder portion 13 where the continuing spray action further cleanses the aggregate, while the rotation of the cylinder causes the portion of the aggregate smaller than the holes 12 to gravitate therethrough onto the conveyor F. The latter conveys this material to a desired destination, such as a storage pile (not shown).

The portion of the aggregate which is too large to pass through the holes 12 in the secondary cylinder portion 13 is advanced by the feed screw 17 outwardly through the righthand open end 70 of the cylinder B to a desired disposal point (not shown).

The water entrained sand and cement flushed through the small holes 10 in the initial cylinder portion 11 drops onto the apron 19 and thence is flushed downwardly through the central apron opening 51 into the sump D.

The rotation of the sand elevating screw 21 performs the double function of agitating the water covered sand and cement in the sump D to further clean the sand from any remaining adhered cement, and also to prevent the cement from settling into the bottom of the sump so that the overflow water from the sump will carry this cement out with it. The sand particles, however, being larger settle in the bottom of the sump regardless of the agitating effect of the screw 21, and the latter elevates this sand through the screw housing extension 54 where it gravitates through the discharge spout 55.

The invention provides a simple and effective mechanism for quickly and effectively turning the nuisance and expense of disposing of normally waste concrete material into a source of profit by the recovery of a substantial amount of valuable and usable material.

While I have illustrated and described a preferred embodiment of the present invention, it will be understood however, that other changes and modifications may be made in the details thereof without departing from the scope of the invention as set forth in the appended claim.

Having thus described the invention, what I claim as new and desire to protect by Letters Patent is defined in the following claim.

I claim:

A waste concrete salvaging machine comprising a frame, a rotary cylindrical screen open at both ends rotatively mounted on the frame, one end of the screen being the inlet end and the other being the outlet, feed means mounted to feed unset waste concrete material for salvaging into the inlet end of the screen, an initial portion of the screen toward the inlet end thereof having small openings therein of a size to pass sand and cement therethrough, a secondary portion of the screen beyond said initial portion having larger openings therein of a size to pass rock aggregate of intermediate size therethrough, a helical conveyor flight mounted interiorly of the cylindrical screen and having a low pitch portion at the initial portion of the screen for slow feeding of the material axially thereof, and having a high pitch portion throughout the secondary portion of the screen for more rapid feeding of material therethrough, spray means connected to a supply of water under pressure, and mounted to deluge substantially the entire contents of the screen with large quantities of water spray during a concrete salvaging operation of the machine, a gravel conveyor moving transversely beneath the secondary portion of the screen to convey away intermediate size aggregate therefrom, all aggregate larger than such intermediate size being discharged through the outlet end of the screen, an overflow type sump mounted beneath the initial portion of the screen to receive sand, cement and water which passes through the small openings therein, and elevator means extending from a low point of the sump to a discharge outlet exteriorly of the sump for agitating the contents of the sump to keep the cement therein suspended in the water therein and to elevate and discharge from the sump the sand which gravitates to the bottom of the sump, flow of water through the spray heads being sufficient to overflow the sump in sufficient volume to flush the water suspended cement from the sump.

References Cited in the file of this patent

UNITED STATES PATENTS

| | | |
|---|---|---|
| 551,772 | King | Dec. 24, 1895 |
| 1,097,855 | Freygang | May 26, 1914 |
| 1,179,842 | Kirksey | Apr. 18, 1916 |
| 1,575,601 | Knoblauch | Mar. 2, 1926 |
| 1,735,738 | Dravo | Nov. 12, 1929 |
| 2,058,959 | Denning | Oct. 27, 1936 |
| 2,331,135 | Ovestrud | Oct. 5, 1943 |
| 2,588,592 | Trundle | Mar. 11, 1952 |
| 2,609,925 | Weisz | Sept. 9, 1952 |

FOREIGN PATENTS

| | | |
|---|---|---|
| 2,247 | Great Britain | Feb. 1, 1893 |
| 526,439 | Canada | June 19, 1956 |